United States Patent
Chen

(10) Patent No.: US 10,891,955 B2
(45) Date of Patent: Jan. 12, 2021

(54) AUDIO CONTROL SYSTEM OF ELECTROMAGNETIC CRADLE

(71) Applicant: Way-Hong Chen, Cottonwood Heights, UT (US)

(72) Inventor: Way-Hong Chen, Cottonwood Heights, UT (US)

( * ) Notice: Subject to any disclaimer, the term of this patent is extended or adjusted under 35 U.S.C. 154(b) by 89 days.

(21) Appl. No.: 16/295,659

(22) Filed: Mar. 7, 2019

(65) Prior Publication Data

US 2020/0243078 A1    Jul. 30, 2020

(51) Int. Cl.
*G10L 15/22* (2006.01)
*G10L 15/30* (2013.01)
*G10L 15/18* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
CPC ..... G10L 15/22; G10L 15/1815; G10L 15/30; G10L 2015/223; A47D 9/02; A47D 13/10; A47D 13/107
See application file for complete search history.

(56) References Cited

U.S. PATENT DOCUMENTS 8,613,118 B1 * 12/2013 Boos ................. A47D 9/02 5/108
2017/0340285 A1 * 11/2017 Rubin ................. A61B 5/6891

FOREIGN PATENT DOCUMENTS

CN             203591092 U  *  5/2014

* cited by examiner

*Primary Examiner* — Sonia L Gay
(74) *Attorney, Agent, or Firm* — Parsons Behle & Latimer

(57) ABSTRACT

An audio control system of an electromagnetic cradle includes an audio transmitting and receiving unit, a cloud server, and a function execution unit. The audio transmitting and receiving unit receives an audio command emitted from a user. The cloud server is connected with the audio transmitting and receiving unit through a network. The cloud server identifies and compares the audio command of the audio transmitting and receiving unit. The function execution unit is connected with the cloud server through the network. The function control module is driven by function indication of the cloud server to execute related functions, including playing the music, lighting or shaking the cradle.

3 Claims, 4 Drawing Sheets

AUDIO CONTROL SYSTEM OF ELECTROMAGNETIC CRADLE

CROSS-REFERENCE TO RELATED APPLICATIONS

This application claims the benefit of, and priority to, Chinese Patent Application No. 201920120875.3, filed on Jan. 24, 2019 and entitled "Audio Control System of Electromagnetic Cradle," the contents of which are herein incorporated by reference in their entirety.

FIELD OF THE DISCLOSURE

The present disclosure relates to an electromagnetic cradle and, more particularly, to an audio control system of an electromagnetic cradle.

BACKGROUND

Description of the Related Art

A cradle is used to pacify a baby. Thus, when the baby is placed in the cradle, the parents may shake the cradle to comfort the baby. A conventional electromagnetic cradle is driven by an electromagnetic force and is used to shake the cradle automatically without needing a manual operation, thereby saving the manual energy, and thereby facilitating the user pacifying the baby. The conventional electromagnetic cradle has a lighting function and may play the music. However, the user needs to press buttons to operate the related functions of the conventional electromagnetic cradle, thereby still causing inconvenience to the user.

BRIEF SUMMARY OF THE DISCLOSURE

An objective of the present disclosure is to provide an audio control system that manipulates diverse functions of an electromagnetic cradle by audio signals. The audio control system is a smart electronic system with functions of audio identification and automatic control.

In accordance with the present disclosure, there is provided an audio control system comprising an audio transmitting and receiving unit, a cloud server, and a function execution unit. The audio transmitting and receiving unit includes an audio receiving module, an audio transmitting module, and an audio terminal connecting module. The audio receiving module receives an audio command emitted from a user. The audio terminal connecting module is electrically connected with the audio receiving module and the audio transmitting module simultaneously. The cloud server is connected with the audio terminal connecting module of the audio transmitting and receiving unit through a network. The audio terminal connecting module of the audio transmitting and receiving unit transmits the audio command of the audio receiving module to the cloud server. The cloud server includes an audio identification module, a function indication module, and an audio response module. The audio identification module identifies and compares the audio command of the audio receiving module and obtains an intent of the audio command. The function indication module transmits a corresponding function indication according to the intent of the audio command. The audio response module transmits a corresponding audio response to the audio terminal connecting module according to the intent of the audio command, and the audio transmitting module transmits the corresponding audio response to the user. The function execution unit includes a function control module, a function terminal connecting module electrically connected with the function control module, a storage module electrically connected with the function control module, a speaker module electrically connected with the function control module, a lighting module electrically connected with the function control module, and a cradle driving module electrically connected with the function control module. The function terminal connecting module is connected with the cloud server through the network. The function control module receives the function indication of the function indication module of the cloud server through the function terminal connecting module. The function control module drives and controls corresponding operation of the storage module, the speaker module, the lighting module, and the cradle driving module according to the function indication of the function indication module.

One advantage of the present disclosure is that the audio control system provides an audio control function to manipulate and control various functions of the electromagnetic cradle by audio transmission, thereby facilitating operation of and enhancing the utility of the electromagnetic cradle.

Another advantage of the present disclosure is that the audio identification and the function indication are processed and operated in the cloud server, to facilitate maintenance and optimization of the program modules, such that the user only needs to connect the audio transmitting and receiving unit and the function execution unit to the network, thereby facilitating the user operating the audio control system.

Further benefits and advantages of the present disclosure will become apparent after a careful reading of the detailed description with appropriate reference to the accompanying drawings.

DETAILED DESCRIPTION

Figure 1:
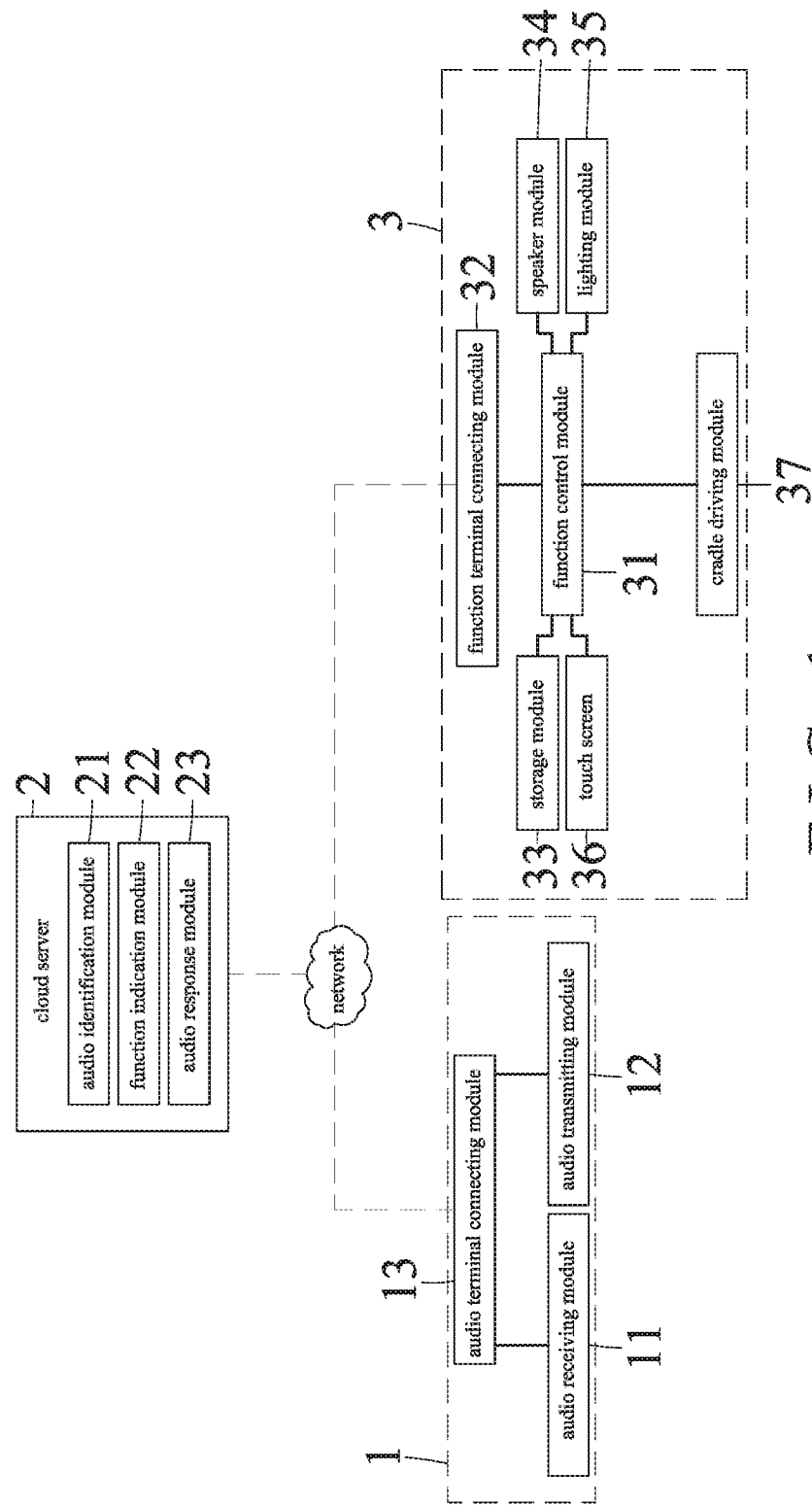
FIG. 1 is a block diagram of an audio control system of an electromagnetic cradle in accordance with an embodiment of the present disclosure.

Referring to the drawings and initially to FIG. 1, an audio (sound or voice or acoustic) control system of an electromagnetic cradle in accordance with an embodiment of the present disclosure comprises an audio transmitting and receiving unit 1, a cloud server 2, and a function execution unit 3.

The audio transmitting and receiving unit 1 is preferably a transceiver and includes an audio receiving module 11, an audio transmitting module 12, and an audio terminal connecting module 13. The audio receiving module 11 receives an audio command (or signal) emitted from a user (or a person). The audio terminal connecting module 13 is electrically connected with the audio receiving module 11 and the audio transmitting module 12 simultaneously.

The cloud server 2 is connected with the audio terminal connecting module 13 of the audio transmitting and receiving unit 1 through a network. The audio terminal connecting module 13 of the audio transmitting and receiving unit 1 transmits the audio command of the audio receiving module 11 to the cloud server 2. The cloud server 2 has multiple program modules and includes an audio identification module 21, a function indication module 22, and an audio response module 23. The audio identification module 21 identifies and compares the audio command of the audio receiving module 11 and obtains an intent (or a meaning) of the audio command. The function indication module 22 transmits a corresponding function indication according to the intent of the audio command. The audio response module 23 transmits a corresponding audio response to the audio terminal connecting module 13 according to the intent of the audio command, and the audio transmitting module 12 transmits the corresponding audio response to the user.

The function execution unit 3 includes a function control module 31 that a person of ordinary skill in the art would understand includes a central processing unit (CPU), a function terminal connecting module 32 electrically connected with the function control module 31, a storage module 33 electrically connected with the function control module 31, a speaker (or loudspeaker) module 34 electrically connected with the function control module 31, a lighting module 35 electrically connected with the function control module 31, and a cradle driving (or actuating) module 37 electrically connected with the function control module 31. The function terminal connecting module 32 is connected with the cloud server 2 through the network. The function control module 31 receives the function indication of the function indication module 22 of the cloud server 2 through the function terminal connecting module 32. The function control module 31 drives and controls corresponding operation of the storage module 33, the speaker module 34, the lighting module 35, and the cradle driving module 37 according to the function indication of the function indication module 22. The storage module 33 is used to store information or data, including music to be played or the like. The speaker module 34 is used to play the music. The lighting module 35 is used to emit light. The cradle driving module 37 is mounted on a main body of an electromagnetic cradle (or rocker bed or swing bed), to drive and rock (or shake) the main body.

In one embodiment of the present disclosure, the function execution unit 3 further includes a touch screen (or display) 36 electrically connected with the function control module 31. The function control module 31 drives and controls corresponding operation of the touch screen 36 according to the function indication of the function indication module 22.

Figure 2:
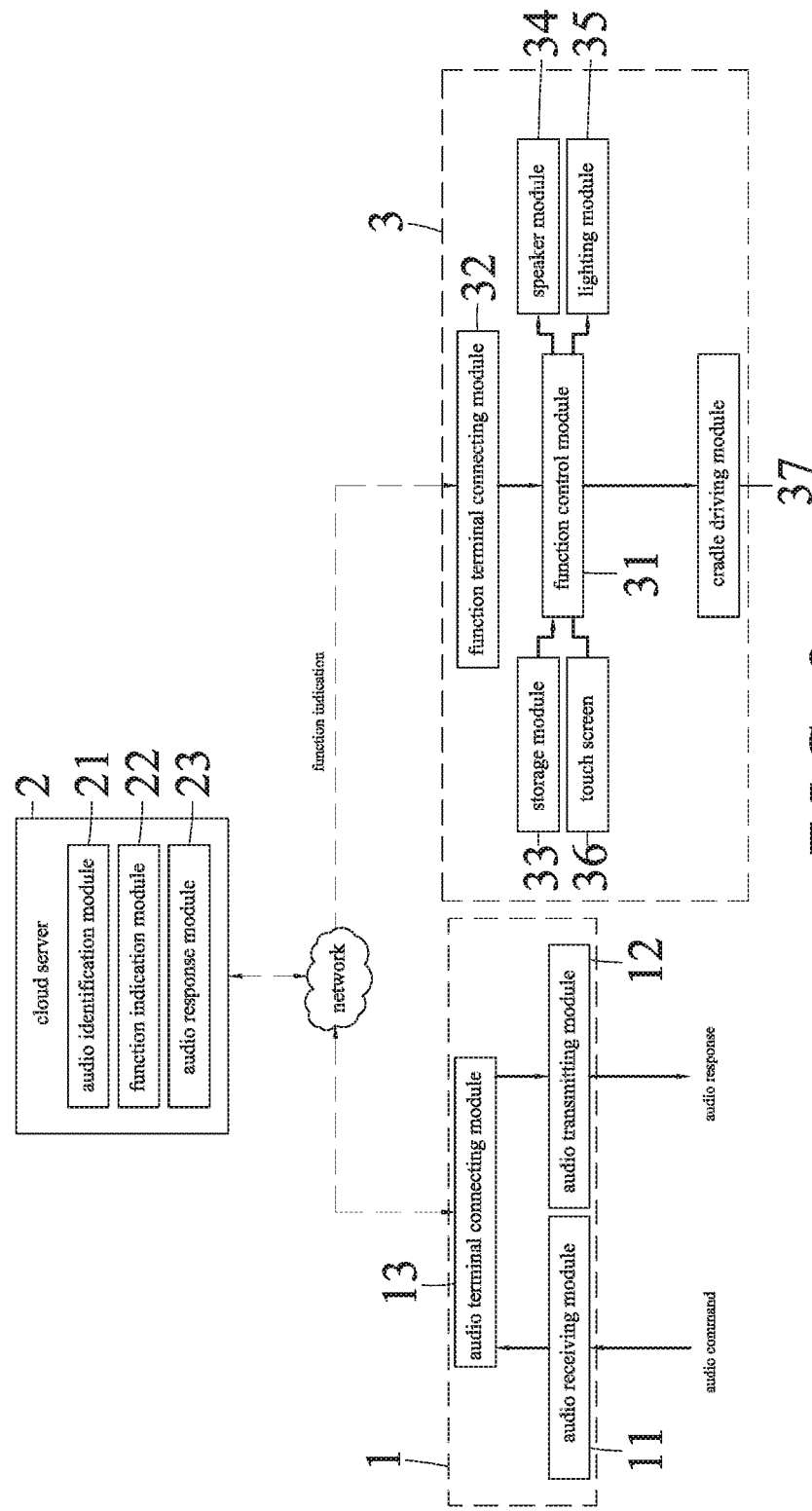
FIG. 2 is a schematic operational view of the audio control system as shown in FIG. 1 in use.

In operation, referring to FIG. 2, when the audio receiving module 11 receives the audio command from the user, the audio terminal connecting module 13 of the audio transmitting and receiving unit 1 transmits the audio command of the audio receiving module 11 through the network to the cloud server 2. The audio identification module 21 of the cloud server 2 identifies and compares the audio command of the audio receiving module 11 and obtains the intent of the audio command. The function indication module 22 of the cloud server 2 corresponds to the intent of the audio command, and transmits a corresponding function indication to the function terminal connecting module 32, according to the intent of the audio command. After the function control module 31 receives the function indication of the function indication module 22, the function control module 31 drives and controls the storage module 33, the speaker module 34, the lighting module 35, the touch screen 36, and the cradle driving module 37, to perform corresponding operation according to the function indication of the function indication module 22.

Figure 3:
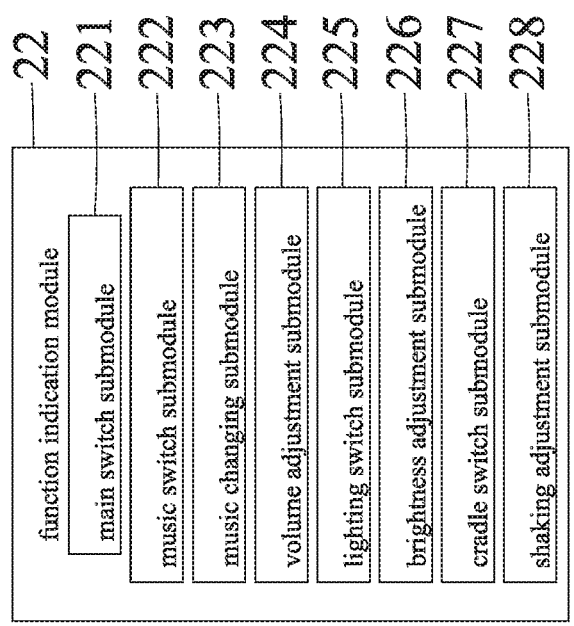
FIG. 3 is a block diagram of a function indication module of the audio control system in accordance with an embodiment of the present disclosure.

Referring to FIG. 3, the function indication module 22 includes a main switch submodule 221, a music switch submodule 222, a music changing (or switching or shifting) submodule 223, a volume adjustment (or regulation) submodule 224, a lighting switch submodule 225, a brightness adjustment submodule 226, a cradle switch submodule 227, and a shaking (or rocking) adjustment submodule 228.

In practice, referring to FIG. 3 with reference to FIG. 2, when the audio receiving module 11 receives the audio command (for example, the audio command is "cradle, please start") from the user, the audio terminal connecting module 13 of the audio transmitting and receiving unit 1 transmits the audio command of the audio receiving module 11 through the network to the cloud server 2. Then, the audio identification module 21 of the cloud server 2 identifies and compares the audio command of the audio receiving module 11 and reads and obtains the intent of the audio command. Then, the main switch submodule 221 of the function indication module 22 is triggered to correspond to the intent of the audio command, and transmits a corresponding function indication through the function terminal connecting module 32 to the function control module 31. After the function control module 31 receives the function indication of the function indication module 22, the function control module 31 turns on and drives the speaker module 34, the lighting module 35, and the cradle driving module 37, to perform corresponding operation according to the function indication of the function indication module 22. In such a manner, the speaker module 34 is started to successively and cyclically play the music stored in the storage module 33 with fifty percent (50%) of the maximum volume, the lighting module 35 is started to light with fifty percent (50%) of the maximum brightness, and the cradle driving module 37 is started to drive the cradle to rock (or shake) with fifty percent (50%) of the maximum power. After the related functions are started, the audio response module 23 transmits a corresponding audio response through the audio terminal connecting module 13 to the audio transmitting module 12, and the audio transmitting module 12 transmits a corresponding audio response (for example, the audio response is "the booting process is accomplished") to the user.

When the user feels that the indoor brightness is sufficient and great enough, and that the volume is too loud, he/she may send an audio command (for example, the audio command is "cradle, please turn off the light and lower the volume"), to trigger the volume adjustment submodule 224 and the lighting switch submodule 225, which transmit corresponding function indication to the function terminal connecting module 32 and the function control module 31, such that the function control module 31 drives the lighting module 35 to turn off the light, and drives the speaker module 34 to adjust the volume so as to play the music with, for example, forty percent (40%) of the maximum volume. After the related functions are finished, the audio response module 23 transmits a corresponding audio response through the audio terminal connecting module 13 to the audio transmitting module 12, and the audio transmitting module 12 transmits a corresponding audio response (for example, the audio response is "the light is turned off, and the volume is lowered") to the user.

When the user feels that the cradle is shaken or rocked too much, he/she may send an audio command (for example, the audio command is "cradle, please reduce the shaking"), to trigger the shaking (or rocking) adjustment submodule 228 which transmit a corresponding function indication to the function terminal connecting module 32 and the function control module 31, such that the function control module 31 drives the cradle driving module 37 to adjust the shaking degree so as to drive the cradle to rock (or shake) with, for example, forty percent (40%) of the maximum power.

In conclusion, the person sends different audio commands which are transmitted to the cloud server 2 which identifies and compares the audio commands of the audio transmitting and receiving unit 1, so as to drive and operate the function execution unit 3 which performs different functions, including playing the music, adjusting the light, and shaking the cradle. In addition, the touch screen 36 shows the volume, brightness and shaking degree to the user. Besides, the user may use the touch screen 36 to adjust the volume, brightness and shaking degree.

Figure 4:
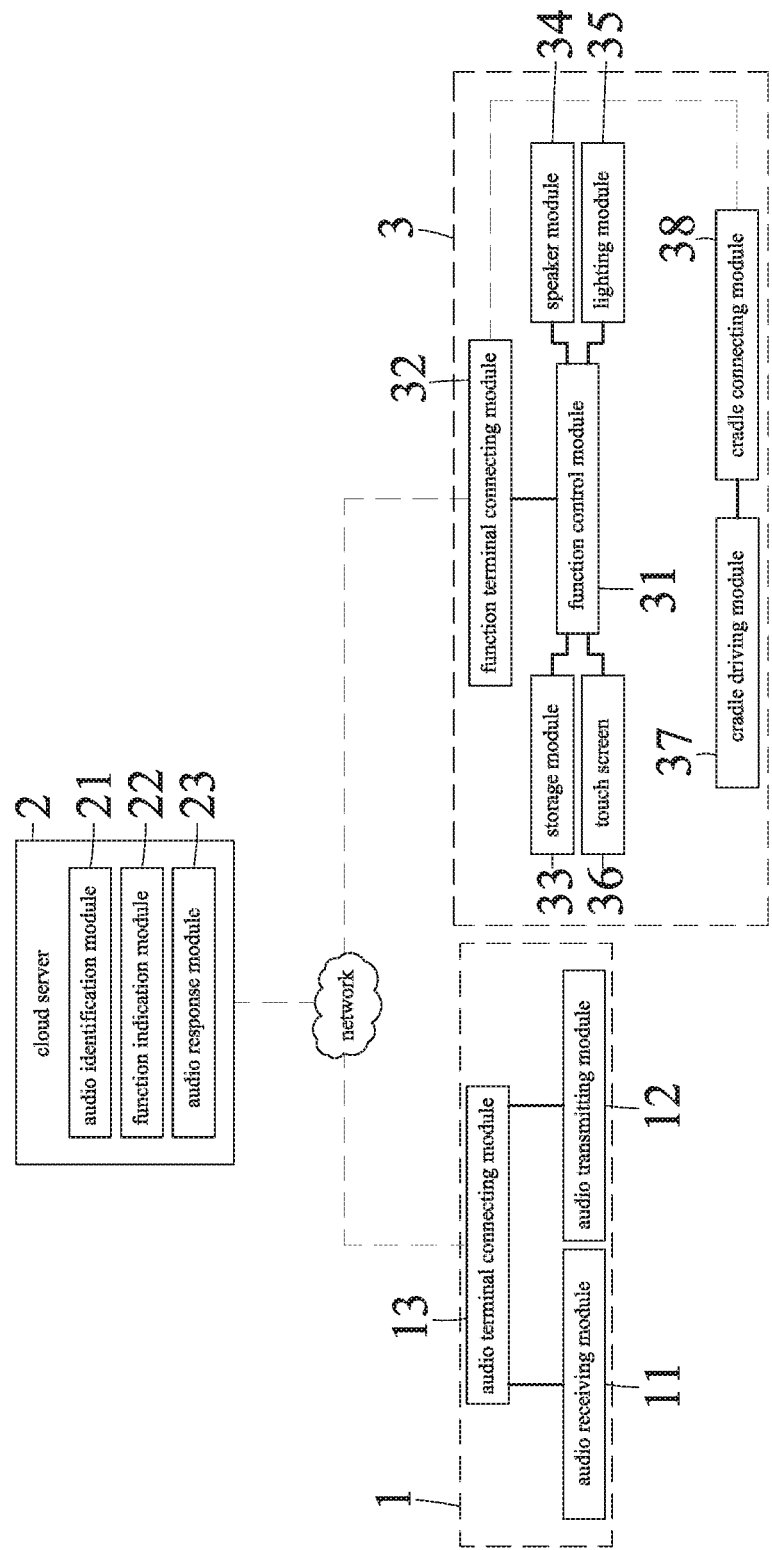
FIG. 4 is a block diagram of an audio control system of an electromagnetic cradle in accordance with another embodiment of the present disclosure.

Referring to FIG. 4, the function control module 31, the function terminal connecting module 32, the storage module 33, the speaker module 34, the lighting module 35, and the touch screen 36 of the function execution unit 3 are integrated and placed in a box. The box is affixed to the main body of the electromagnetic cradle or attached to the main body of the electromagnetic cradle by hangers or hooks. The function execution unit 3 further includes a cradle connecting module 38 electrically connected with the cradle driving module 37. The cradle connecting module 38 is provided on the main body of the electromagnetic cradle. The cradle connecting module 38 and the function terminal connecting module 32 of the box are connected by wireless connection, for example, by a communication element, such as Bluetooth or the like. The audio receiving module 11, the audio transmitting module 12, and the audio terminal connecting module 13 of the audio transmitting and receiving unit 1 are integrated and placed in a second box. Alternatively, the audio transmitting and receiving unit 1 is provided in a hand held device, such as a cell phone or smart phone. The cell phone is connected to a video camera in a baby room. Thus, when the parents observe that the baby is crying in the electromagnetic cradle, the audio transmitting and receiving unit 1 is used to remote control and start the function execution unit 3, to play the music and shake the electromagnetic cradle, so as to pacify the baby.

Accordingly, the audio control system provides an audio control function to manipulate and control various functions of the electromagnetic cradle by audio transmission, thereby facilitating operation of and enhancing the utility of the electromagnetic cradle. In addition, the audio identification and the function indication are processed and operated in the cloud server 2, to facilitate maintenance and optimization of the program modules, such that the user only needs to connect the audio transmitting and receiving unit 1 and the function execution unit 3 to the network, thereby facilitating the user operating the audio control system.

Although the disclosure has been explained in relation to the embodiment(s) mentioned above, it is to be understood that many other possible modifications and variations can be made without departing from the scope of the present disclosure. It is, therefore, contemplated that the appended claim or claims will cover such modifications and variations that fall within the scope of the disclosure. Accordingly, the scope of the present disclosure is defined only by reference to the appended claims and equivalents thereof.

The invention claimed is:

1. An audio control system comprising:
an audio transmitting and receiving unit, a cloud server, and a function execution unit; wherein:
the audio transmitting and receiving unit receives an audio command emitted from a user;
the cloud server is connected with the audio transmitting and receiving unit through a network;
the audio transmitting and receiving unit transmits the audio command to the cloud server;
the cloud server identifies and compares the audio command and obtains an intent of the audio command;
the cloud server transmits a corresponding function indication according to the intent of the audio command;
the cloud server transmits a corresponding audio response to the audio transmitting and receiving unit according to the intent of the audio command;
the audio transmitting and receiving unit transmits the corresponding audio response to the user;
the function execution unit includes a central processing unit (CPU) a function terminal connecting module electrically connected with the CPU, a storage module electrically connected with the CPU, a speaker module electrically connected with the CPU, a lighting module electrically connected with the CPU, and a cradle driving module electrically connected with the CPU;
the function terminal connecting module is connected with the cloud server through the network;
the CPU of the function execution unit receives the function indication of the cloud server through the function terminal connecting module; and
the CPU of the function execution unit drives and controls corresponding operation of the storage module, the speaker module, the lighting module, and the cradle driving module according to the function indication.

2. The audio control system of claim 1, wherein the function execution unit further includes a touch screen electrically connected with the CPU.

3. The audio control system of claim 1, wherein:
the function terminal connecting module, the storage module, the speaker module, the lighting module, and the touch screen of the function execution unit are integrated and placed in a box;
the function execution unit further includes a cradle connecting module electrically connected with the cradle driving module; and
the cradle connecting module and the function terminal connecting module of the box are connected by wireless connection.

* * * * *